(No Model.)
J. G. GILLELAND.
ANIMAL TRAP.
No. 288,225. Patented Nov. 13, 1883.
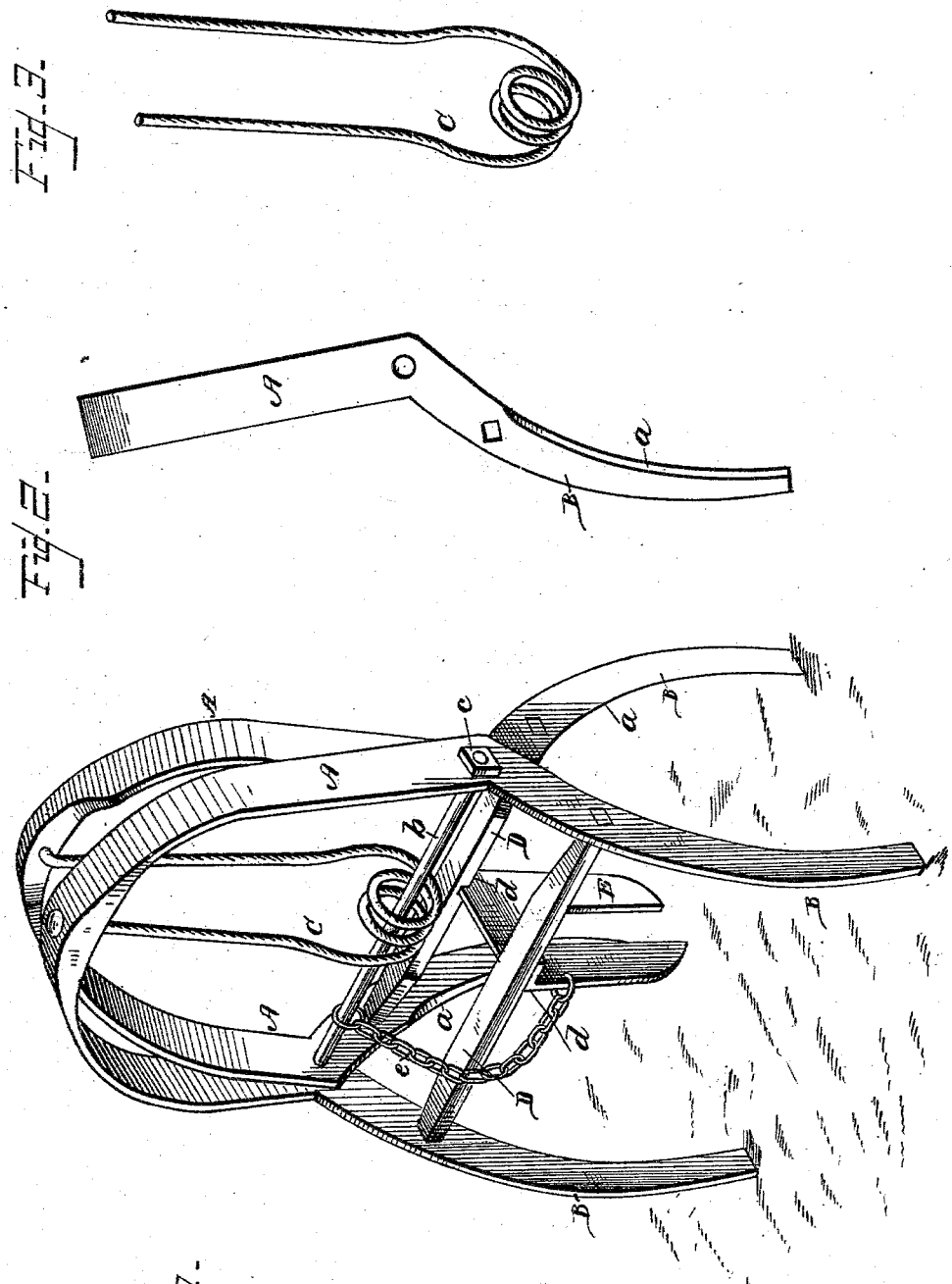
WITNESSES
F. L. Ourand
N. E. Oliphant
INVENTOR
James G. Gilleland,
per. Chas. N. Fowler,
Attorney

UNITED STATES PATENT OFFICE.

JAMES G. GILLELAND, OF PALMYRA, MICHIGAN.

ANIMAL-TRAP.

SPECIFICATION forming part of Letters Patent No. 288,225, dated November 13, 1883.

Application filed September 3, 1883. (No model.)

*To all whom it may concern:*

Be it known that I, JAMES G. GILLELAND, a citizen of the United States, residing at Palmyra, in the county of Lenawee and State of Michigan, have invented certain new and useful Improvements in Animal-Traps; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, a detail view of one of the frames, and Fig. 3 a similar view of the spring.

This invention relates to that class of animal-traps generally known as "mole-traps."

Previous to this invention mole-traps have been constructed of two metal frames terminating in outwardly-curved jaws, each provided with a knife-edge, said frames being pivotally connected together by a horizontal rod passing through the same, and also through ears extending from the inner side of curved levers, to thus pivotally connect them with relation to the frames, said levers having their upper ends secured to the top portion of these frames and adapted to receive the ends of an interposed curved spring, the lower ends of these levers being curved outwardly to engage with an arched plate or dog, by which such a trap is held in its set position.

The object of the present invention is to improve the construction of this class of mole-traps so as to dispense with the curved levers and interposed curved spring, and at the same time provide a trap that will be cheaper of manufacture, more easily set, and certain in its action, as well as less liable to become broken or inoperative from exposure or rust, these several objects being attained by the construction substantially as shown in the accompanying drawings, and hereinafter more fully described.

In the drawings, A represents two metal frames, that portion thereof forming the sides terminating in outwardly-curved jaws B, each of which is formed with a knife-edge, $a$. These frames A are pivotally connected together by a horizontal rod, $b$, passing through the same, said rod being headed upon one end and screw-threaded upon the other to receive a binding-nut, $c$. Not only does this rod $b$ pass through the frames, but also through the coil of an inverted spring, C, the ends of which are connected directly to the upper central portion of the frames, the rod serving to prevent the spring from becoming displaced. This form of spring is preferred on account of its small cost, and also as it not only serves its purpose as a spring, but by connecting with the frames direct does away with the necessity of the curved levers and interposed spring usually employed.

The frames A are each provided with a cross-bar, D, which not only serves as a brace, but also for the purpose of engaging with shoulders $d$ of an arched plate or dog, E, which holds the jaws apart when the trap is in its set position, said plate or dog being secured to the rod $b$ by a chain, $e$, to prevent its being lost.

In the operation of my invention the trap is set by pressing inwardly upon the frames A, thereby causing the jaws to open, and the plate or dog E is interposed between the cross-bars D, the force of the spring C serving to keep said plate or dog in this position unless disturbed by a mole or other animal. The trap being thus set is so placed as to have the jaws B upon each side of the runway or path of the mole and the plate or dog directly across the same. As the mole passes in either direction between these jaws, it strikes the plate or dog, causing it to be dislodged, when the force of the spring C will cause the jaws to quickly spring together and catch the animal between their knife-edges $a$, thereby causing instant death.

The frames A being of U shape, terminating in curved knife-edge jaws B, which are braced and strengthened by the bars D, form together a trap superior in strength and durability to those of the ordinary construction.

The free ends of the spring C being connected to the upper portion of the frames A, should the ends become detached therefrom the rod $b$, which passes through the coil of the spring, will prevent it from becoming wholly separated from the trap and lost.

Having now fully described my invention, what I claim, and desire to secure by Letters Patent, is—

An animal-trap consisting of two U-shaped frames terminating in curved knife-edge jaws, which are braced by cross-bars connecting the jaws of each frame, a wire coiled spring connected to the frames and coiled around the rod, pivotally connecting the jaws together, and a suitable arched dog for holding the jaws apart, substantially as and for the purpose set forth.

In testimony that I claim the above I have hereunto subscribed my name in the presence of two witnesses.

JAMES G. GILLELAND.

Witnesses:
S. H. SALSBURY,
J. L. O'MEALEY.